Jan. 8, 1935.  W. O. TWOMBLY  1,987,381
ELECTRIC HEATER
Filed Feb. 5, 1930

INVENTOR
Willard O. Twombly
BY Chappell Earl
ATTORNEYS

Patented Jan. 8, 1935

1,987,381

UNITED STATES PATENT OFFICE 1,987,381

ELECTRIC HEATER

Willard O. Twombly, Jackson, Mich., assignor to C T Electric Company, Jackson, Mich., a corporation of Michigan Application February 5, 1930, Serial No. 425,995

8 Claims. (Cl. 219—40)

While my improved electric heater is adapted for embodiment in various relations, I have only shown it, in the accompanying drawing, as embodied in a cooking apparatus.

The main objects of this invention are:

First, to provide a self-controlled or automatic electric heater.

Second, to provide an electric heater which may be adapted to a great variety of purposes or uses as in a cooking apparatus, steam heaters, hot water heaters and the like.

Third, to provide an electric heating apparatus which operates in the beginning at its maximum heating capacity, its capacity varying as the temperature is raised beyond predetermined points.

Fourth, to provide an apparatus having these advantages which is very simple, economical and durable in its parts.

Objects relating to details and economies of my invention will appear from the description to follow.

The invention is defined and pointed out in the claims.

A structure which is a preferred embodiment of my invention is illustrated in the accompanying drawing, in which.

Figure 1:
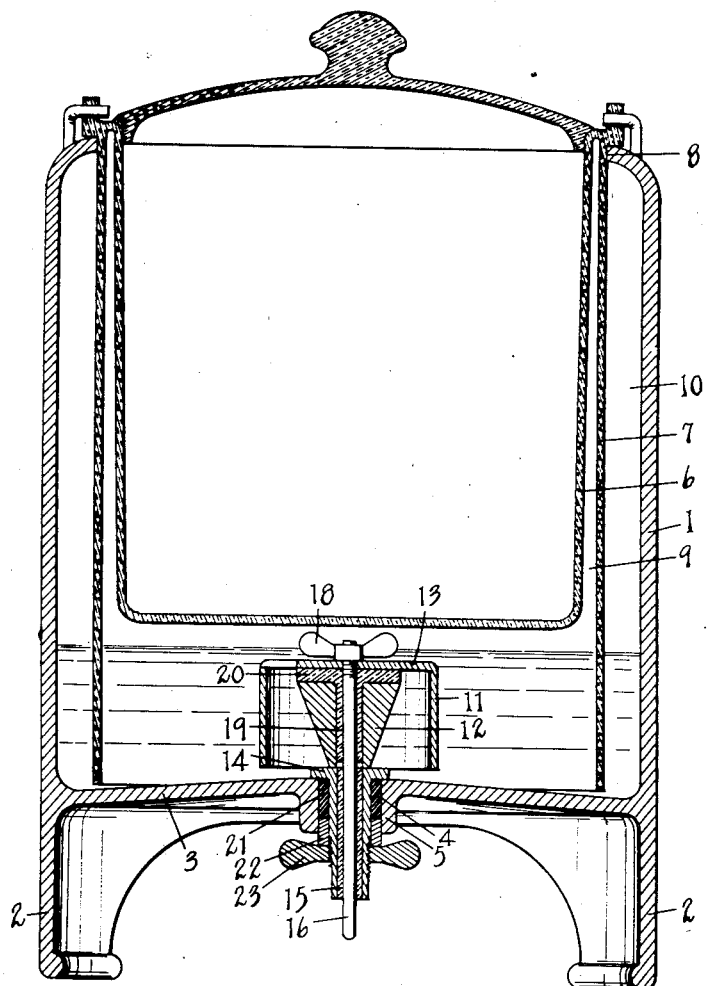
Fig. 1 is a vertical central section of a cooking apparatus embodying the features of my invention, certain parts being shown in full lines for convenience in illustration.
Figure 2:
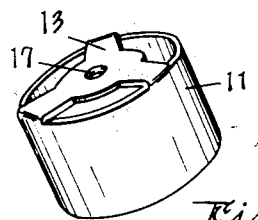
Fig. 2 is a perspective view of one of the electrodes.
Figure 3:
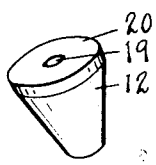
Fig. 3 is a perspective view of the other electrode.

The embodiment of my invention illustrated comprises a reservoir 1 which is preferably of glass open at the top and having legs 2. The bottom 3 of this reservoir is somewhat convexed and has a central opening 4 therein provided with a downwardly projecting flange 5. The reservoir is open at the top to receive a receptacle 6. This receptacle or cooker is also preferably formed of glass.

Between the receptacle and the wall of the reservoir I arrange an annular baffle wall 7, this baffle wall being joined to the upper edge of the receptacle by a steam light joint and fitting within the opening 8 at the top of the reservoir constituting a closure therefor. The lower edge of the baffle wall terminates adjacent to but in spaced relation to the bottom of the reservoir thereby providing a main chamber 9 into which the receptacle 6 depends and a surrounding auxiliary chamber 10.

The reservoir is adapted to receive a liquid as indicated and this serves as a water seal between the chambers 9 and 10.

Within the main chamber I mount a coacting pair of electrodes 11 and 12, the electrode 11 being annular and having a supporting spider 13 at the top, the electrode 12 being in the form of an inverted cone or downwardly tapered.

To support the electrodes in proper relation and permit their removal for cleaning and also to seal the opening in the bottom of the reservoir, I provide a flanged sleeve 14 having an insulating bushing 15 through which the conductor 16 for the electrode 13 is arranged. This conductor is arranged through a central hole 17 in the spider 13 and threaded to receive a winged nut 18.

The electrode 12 has a central bore and is provided with an insulating bushing 19 with a flange 20 at its upper end projecting between the two electrodes so that the electrodes are insulated from each other.

The sleeve 15 engages the lower end of the electrode 12 constituting a connector therefor.

A packing 21 is arranged in the opening in the bottom of the reservoir with its upper end in supporting engagement with the flange on the upper end of the sleeve, its lower end being engaged by the gland or thrust ring 22 adjustably supported by the wing nut 23 threaded upon the lower end of the sleeve.

Circuit wires, not illustrated, are suitably connected to the connectors 14 and 16.

The electrode 11 is thus supported with its lower edge in spaced relation to the bottom of the reservoir so that cold water may enter the bottom of the electrode and pass out at the top thereof.

With the electrodes thus arranged, the submerging fluid constitutes a resistance connection between the electrodes and consequently is heated when the current is turned on. When the liquid becomes heated to the steam generating point, the steam rises around the receptacle 6 and as the pressure increases, it forces water from the main into the auxiliary chamber thereby lowering the liquid level in the main or generating or heating chamber and owing to the character of the electrodes, the area thereof under water is correspondingly decreased, and the space between the electrodes increased. For example, the heater is at its maximum capacity when the electrodes are entirely submerged in water, as illustrated in Fig. 1, and at its minimum capacity when the water level is at the lowest part of the cone-shaped electrode 12.

In addition to receiving the water from the main chamber, the auxiliary chamber provides a water seal and also a water jacket and insulator for the main chamber and the cooking receptacle suspended therein and after the heater has been in operation for a sufficient length of time provides a hot water feeder for the main chamber.

The apparatus is automatic in its action. It will be appreciated that variations in the size of the electrodes is also automatically compensated for in the operation of the heater for the reason that although larger electrodes would raise a given amount of water to the boiling point more quickly than smaller electrodes, it would consume more current in the length of time but when the water begins to boil, the current consumption is the same for the same amount of work. This is a very desirable feature in adapting my invention to various uses.

While the structure illustrated is of the double boiler food cooker type, various modifications of this in cooking apparatus and in adaptations to water heaters, radiators and the like will, it is believed, be readily understood by those skilled in the art to which my invention relates and I have, therefore, not attempted to illustrate or describe such modifications and adaptations herein.

Having thus described my invention, what I claim as new and desire to secure by Letters Patent, is:

1. In a heating apparatus of the class described, the combination of a reservoir open at the top, a receptacle disposed in said top opening and constituting a closure therefor, a baffle wall disposed in concentric spaced relation to said receptacle and connected to its upper edge, the lower edge of the baffle wall being adjacent to but spaced from the bottom of the reservoir, the space within the baffle wall constituting a main chamber and the space at the outside of the baffle wall constituting an auxiliary and water chamber, and a heating unit disposed at the bottom of the main chamber and comprising an annular electrode of substantially uniform internal diameter disposed with its lower edge in spaced relation to the bottom of the reservoir and open at the top to permit circulation of water therethrough, and a coacting inverted conical electrode disposed in central spaced relation within said annular electrode.

2. In a heating apparatus of the class described, the combination of a reservoir open at the top, a receptacle disposed in said top opening and constituting a closure therefor, a baffle wall disposed in concentric spaced relation to said receptacle and connected to its upper edge, the lower edge of the baffle wall being adjacent to but spaced from the bottom of the reservoir, the space within the baffle wall constituting a main chamber and the space at the outside of the baffle wall constituting an auxiliary and water seal chamber, and a heating unit disposed within the main chamber and comprising electrodes disposed in spaced coacting relation.

3. In a heating apparatus of the class described, the combination of a reservoir, a baffle wall disposed in concentric spaced relation relative to the walls of said reservoir, the lower edge of the baffle wall being adjacent to but spaced from the bottom of the reservoir, the space within the baffle wall constituting a main chamber and the space at the outside of the baffle wall constituting an auxiliary and water seal chamber, and a heating unit disposed at the bottom of the main chamber and comprising an annular electrode of substantially uniform internal diameter disposed with its lower edge in spaced relation to the bottom of the reservoir and open at the top to permit circulation of water therethrough and a coacting inverted conical electrode disposed centrally within said annular electrode.

4. In a heating apparatus of the class described, the combination of a reservoir open at the top, a receptacle disposed in said top opening and constituting a closure therefor, a baffle wall disposed in concentric spaced relation to said receptacle and connected thereto to form a sealed end, the lower edge of the baffle wall being adjacent to but spaced from the bottom of the reservoir, the space within the baffle wall constituting a main chamber and the space at the outside of the baffle wall constituting an auxiliary and water seal chamber, and a heating unit disposed within the main chamber and comprising electrodes disposed in spaced coacting relation.

5. A liquid level regulated electrical heating unit of the immersion type comprising an outer annular electrode of substantially uniform internal diameter and an inverted conical electrode disposed centrally relative thereto.

6. A liquid level regulated electrical heating unit comprisng a pair of spaced electrodes, one of said electrodes being tapered downwardly, the other being annular and of a substantial uniform internal diameter from end to end and disposed in a concentric relation to the tapered electrode.

7. A liquid level regulated electrical heating unit of the immersion type comprising spaced outer and inner electrodes presenting surfaces generated from elements oblique to each in the same vertical plane, the surface of one of said electrodes diminishing downwardly whereby the resistance of the immerging liquid to an electrical circuit passed between said electrodes varies as to both the distance between and the area of said electrodes.

8. A liquid level regulated electrical heating unit of the immersion type comprising spaced electrodes presenting surfaces generated from elements oblique to each in the same vertical plane, the surface of one of said electrodes diminishing downwardly whereby the resistance of the immerging liquid to an electrical circuit passed between said electrodes varies as to both the distance between and the area of said electrodes.

WILLARD O. TWOMBLY.